United States Patent [19]
Kishimoto et al.

[11] Patent Number: 5,569,695
[45] Date of Patent: Oct. 29, 1996

[54] SELF-FUSION TYPE DAMPING MATERIAL

[75] Inventors: Atsunori Kishimoto, Higashihiroshima; Takashi Fujii, deceased, late of Hiroshima, by Naoko Fujii, legal representative & heir, Ayako Fujii, Natsuko Fujii, Eriko Fujii, heirs; Kazutaka Ohshita, Hiroshima; Kazumi Yamamoto, Higashihiroshima; Yasuhiko Fujii, Ohtake; Tetsuro Toda, Hiroshima, all of Japan

[73] Assignees: Toda Kogyo Corp.; Hirotani Co. Ltd., both of Japan

[21] Appl. No.: 256,463
[22] PCT Filed: Apr. 24, 1992
[86] PCT No.: PCT/JP92/00534
§ 371 Date: Mar. 23, 1994
§ 102(e) Date: Mar. 23, 1994
[87] PCT Pub. No.: WO93/22381
PCT Pub. Date: Nov. 11, 1993
[51] Int. Cl.$^6$ .............. C08J 3/00; C08K 3/10; C08L 31/04
[52] U.S. Cl. ............ 524/435; 524/398; 524/431
[58] Field of Search ................ 524/435, 398, 524/431

[56] References Cited
U.S. PATENT DOCUMENTS
5,260,367 11/1993 Toda et al. ............... 524/449
5,350,793 9/1994 Kishimoto et al. ............ 524/449

FOREIGN PATENT DOCUMENTS
| 0545625 | 9/1993 | European Pat. Off. . |
| 42-9880 | 5/1967 | Japan . |
| 51-90323 | 8/1976 | Japan . |
| 59-80454 | 5/1984 | Japan . |
| 3-47750 | 2/1991 | Japan . |

*Primary Examiner*—Paul R. Michl
*Assistant Examiner*—Patrick Niland
*Attorney, Agent, or Firm*—Nixon & Vanderhye

[57] ABSTRACT

The present invention is a self-fusion type damping material formed from hard ferrite powder as a filler with a binder, in which the binder comprises an ethylene-vinyl acetate copolymer and a petroleum resin and 100 parts by weight of the combined binder and 150 to 600 parts by weight of the filler are mixed, or a self-fusion type damping material formed from hard ferrite powder and an auxiliary filler as a filler, if necessary, with a binder, in which the binder comprises an ethylene-vinyl acetate copolymer and a petroleum resin and 100 parts by weight of the combined binder and 100 to 600 parts by weight of said combined filler, in which the amount of said hard ferrite powder is in the range of 50 to 400 parts by weight and that of said auxiliary filler is in the range of 1 to 200 parts by weight, are mixed.

2 Claims, No Drawings

SELF-FUSION TYPE DAMPING MATERIAL

INDUSTRIAL APPLICATION FIELD

The present invention relates to a self-fusion type damping material having excellent self-fusibility and a high damping effect. The main application fields thereof are vehicle, marine vessel, electric apparatus, machinery, architecture, building material, and the like.

PRIOR ART

As is generally known, a damping material is widely used in various fields to prevent and suppress vibration and noise generated due to rotation of an engine, a motor, etc. used in electric and mechanical apparatus, such as a vehicle, for instance, automobile or electric train, marine vessel, laundry machine, dryer, acoustic instrument, precision machine tool, or plant equipment; vibration and noise generated with pipes and conduits of water, gas, etc. or with ducts for air conditioning, etc. equipped in building, house, etc.; and vibration generated at the time a vehicle travels on a road or railroad.

Generally speaking, a damping material is manufactured by forming a filler, such as mica powder, with a binding material into a sheet or block by a molding method such as extrusion molding, calendering, compression molding, injection molding or cast molding. Specifically, a sheet form damping material is often used by applying through heat fusion or adhering on a substrate, such as a steel plate.

Recently, the vehicle, marine vessel, electric and mechanical apparatus, architecture, building material, and the like tend to be lighter in weight and smaller in size, and a damping material to be used therein correspondingly needs to be lighter, thinner and smaller. Accordingly, the damping material is strongly required to have a high damping effect.

Further, when a damping material is mounted on a substrate, it is necessary that the material has excellent applicability and workability, such as, easy handling, easy mounting and the like. For that end, it is strongly required that the material has excellent adhesion to a substrate: in other words, the material should be excellent at adhering firmly to the substrate, namely adhesion strength, and at being sufficiently fitted to an uneven surface or a complex shape of the substrate, that is adaptability.

When a damping material is mounted on a ceiling or vertical part, a method using an adhesive or an adhesive double coated tape, or a method comprising applying hot melt on the surface on which the material is to be mounted and then subjecting the hot melt to the heat fusion has generally been utilized. However, when the former method is used, a release paper added to the adherent surface must be peeled off upon application thereof and accordingly it is inconvenient to handle. In the latter method, the damping material should be adhered through heat fusion while continually taking care to prevent the material from sagging or dropping out and this has caused reduction of the applicability and workability.

A method has been proposed and brought into practice in which hard ferrite powder is used as a filler, a damping material is then formed from the filler with a binder and magnetized so that magnetic adsorption force is imparted to the material, hereinafter referred to as "self-fusion type damping material", which is placed on a predetermined position with the aid of the magnetic adsorption force in such a manner as to prevent the material from being dislocated or sagging, followed by heat fusion.

The self-fusion type damping material must have sufficient magnetic adsorption to suppress and prevent its dislocation and sagging. Further, the material is required to have not only the above-described adhesion properties such as adhesion strength and adaptability but also excellent heat fusibility when it is adhered through heat fusion.

Conventionally known self-fusion type damping materials include damping materials manufactured by forming a magnetic material having high residual magnetism, such as barium ferrite powder or strontium ferrite powder, with a fusible bituminous material [Japanese Patent Publication (KOKOKU) No. 42-9880 (1967)] and by forming a magnetic material having residual magnetism and a powder obtained by baking solid materials in a waste liquid of paper making with a bituminous material and/or a synthetic rubber and/or a synthetic resin [Japanese Patent Application Laying Open (KOKAI) No. 51-90323 (1976)].

PROBLEMS THE INVENTION IS TO SOLVE

Although a self-fusion type damping material having excellent self-fusibility and a high damping effect is most strongly demanded at present, the damping materials described in the above-mentioned Japanese Patent Publication (KOKOKU) No. 42-9880 (1967) and Japanese Patent Application Laying Open (KOKAI) No. 51-90323 (1976) can not necessarily be deemed to sufficiently fulfill these characteristics as will be shown in Comparative Examples described later. Thus, as are shown in Comparative Examples described later, their damping effect is not high enough; that is, their loss factor, $\eta$, is about 0.12 at the highest.

A technical object of the present invention is to provide a damping material having excellent self-fusibility and a high damping effect.

MEANS FOR SOLVING THE PROBLEMS

The technical problem can be solved by the present invention.

The present invention relates to a self-fusion type damping material formed from hard ferrite powder as a filler with a binder in which said binder comprises an ethylene-vinyl acetate copolymer and petroleum resin, and 100 parts by weight of the combined binder and 150 to 600 parts by weight of said filler are mixed (or compounded) and formulated into the material, and to a self-fusion type damping material formed from a filler which is a mixture of hard ferrite powder and an auxiliary filler with a binder in which said binder comprises an ethylene-vinyl acetate copolymer and petroleum resin, and 100 parts by weight of the combined binder is mixed with 100 to 600 parts by weight of the combined filler, with said hard ferrite powder being in the range of 50 to 400 parts by weight and said auxiliary filler being in the range of 1 to 200 parts by weight, to form the material.

The self-fusion type damping material of the present invention has a shear strength of not less than 1.0 kg/cm$^2$ so that it hardly drops out, has excellent self fusibility, i.e., an adaptability of not higher than 2.0 mm, and further has excellent damping effect, i.e., a peak value of loss factor, $\eta$, of not less than 0.3.

The self-fusion type damping material of the present invention containing, as a filler, hard ferrite powder and an auxiliary filler can be further reduced in weight, thickness and size, while keeping the above-mentioned various characteristics. Especially, in case where the auxiliary filler used with the hard ferrite powder is scaly powder, the material can be lighter, thinner and smaller as compared with the material using only hard ferrite powder while the peak value of loss factor can also be improved.

Hereinafter, various conditions for practicing the present invention will be described.

The hard ferrite powder of the present invention is barium ferrite powder or strontium ferrite powder and any shape of the particles in granular or platelike, etc. can be used. With respect to the particle size of hard ferrite powder, taking its kneadability to resins into consideration, BET specific surface area of 0.1 to 10 $m^2/g$ is preferable. Regarding magnetic properties, coercive force of not less than 1000 Oe and residual magnetization of not less than 15 emu/g are preferable taking an adsorption by magnetic force into consideration with coercive force of not less than 1500 Oe and residual magnetization of not less than 20 emu/g being more preferable.

The binder used in the present invention comprises an ethylene-vinyl acetate copolymer and a petroleum resin and commercially available products can be used.

The ethylene-vinyl acetate copolymer used is preferably a copolymer of ethylene and vinyl acetate containing 30 to 65% by weight of vinyl acetate, taking its self-fusibility and damping effect into consideration. The petroleum resin used is preferably an aromatic petroleum resin having a softening point of 70° to 130° C. obtained by polymerizing a fraction (C9 fraction) containing aromatic unsaturated hydrocarbons having 9 carbon atoms as a main constituent, which is by-produced upon petroleum purification and petroleum cracking, etc., or an aliphatic-aromatic petroleum resin having a softening point of 60° to 120° C. obtained by copolymerizing not less than 65% by weight of the C9 fraction and a fraction (C4, C5 fractions) containing aliphatic unsaturated hydrocarbons having 4 to 5 carbon atoms as a constituent, taking its self-fusibility and damping effect into consideration.

The aromatic petroleum resin can be obtained, for example, by polymerizing a cracked fraction having a boiling point in the range of 140° to 220° C. obtained by petroleum cracking, that is, a fraction containing one or more of styrene, vinyltoluene, indene, divinylbenzene, vinylnaphthalene, etc.

The ratio of the ethylene-vinyl acetate copolymer to the petroleum resin is preferably 160 to 330 parts by weight of the petroleum resin per 100 parts by weight of the ethylene-vinyl acetate copolymer, taking the self-fusibility and damping effect into consideration.

The ratio of the binder to the hard ferrite powder in the invention is 150 to 600 parts by weight of hard ferrite powder based on 100 parts by weight of the ethylene-vinyl acetate copolymer and petroleum resin combined. When it is less than 150 parts by weight, a loss factor of the damping material is not higher than 0.3 and sufficient damping effect can not be obtained. When it is over 600 parts by weight, a shear strength of the material is not enough and its adaptability is low as well.

The auxiliary filler used with hard ferrite powder in the present invention can be scaly powder, such as mica powder, platelike iron oxide powder or graphite powder; balloons of glass, silica or resin; calcium carbonate; clay; barium sulfate; zinc oxide; or the like. The size of the scaly particle is about 1 to 1000 μm in diameter of the scaly particle and about 1 to 500 μm is preferable.

The hard ferrite powder is used in an amount of 50 to 400 parts by weight based on 100 parts by weight of the ethylene-vinyl acetate copolymer and petroleum resin combined. If it is less than 50 parts by weight, sufficient adsorption by magnetic force can not be obtained and the resulting damping material can not be mounted on a ceiling or vertical surface. If it is over 400 parts by weight, although a damping effect aimed by the present invention may be obtained, it is meaningless to use the filler in an amount more than necessary.

The auxiliary filler is used in an amount of 1 to 200 parts by weight based on 100 parts by weight of the ethylene-vinyl acetate copolymer and petroleum resin combined. If it is less than 1 part by weight, it is difficult to make the damping material lighter, thinner and smaller effectively. If it is over 200 parts by weight, sufficient shear strength can not be obtained and adaptability is low. To make the material lighter, thinner and smaller effectively while maintaining its damping effect, the lower limit of the auxiliary filler is preferably 10 parts by weight.

The total amount of the hard ferrite powder and auxiliary filler combined is 100 to 600 parts by weight based on 100 parts by weight of the binder. If it is less than 100 parts by weight, sufficient damping effect of the material can not be obtained. If it is over 600 parts by weight, the adhesion strength and adaptability become low.

When the scaly powder is used as the auxiliary filler, its damping effect can be improved more effectively than the case the hard ferrite powder is only used, and its loss factor, η, can be higher than 0.32.

In the present invention, the damping material may contain a plasticizer, such as process oil, DOP, stearic acid, Zn stearate, Mg stearate or Ca stearate; or a polymer, such as thermoplastic resin or rubber, which is usually used to improve various properties of a damping material.

ACTION

The most important point of the present invention is the fact that a self-fusion type damping material obtained by forming hard ferrite powder as a filler with a binder, in which said binder comprises an ethylene-vinyl acetate copolymer and petroleum resin and 100 parts by weight of the combined binder and 150 to 600 parts by weight of said filler are mixed, has excellent self-fusibility and a high damping effect.

The important point of the present invention is the fact that a self-fusion type damping material obtained by compounding a hard ferrite powder filler and an auxiliary filler with a binder, in which said binder comprises an ethylene-vinyl acetate copolymer and petroleum resin, and 100 parts by weight of the combined binder are mixed with 100 to 600 parts by weight of said combined filler, with amounts of said hard ferrite powder and auxiliary filler being in the range of 50 to 400 parts by weight and 1 to 200 parts by weight, respectively, based on 100 parts by weight of the combined binder, can be further lighter, thinner and smaller while keeping the properties, that is, excellent self-fusibility and a high damping effect.

The present inventors believe that the reason why the self-fusion type damping material of the present invention has excellent self-fusibility and a high damping effect may be a synergistic effect of hard ferrite powder and a specifically combined binder comprising the ethylene-vinyl acetate copolymer and petroleum resin, since when either a bituminous material or an ethylene-vinyl acetate copolymer is only used as a binder, the effect which is an object of the present invention can not be obtained as are shown in Comparative Examples described later. Further, when a petroleum resin is only used as a binder, toughness is too poor to form the material.

EXAMPLE

Hereinafter, the present invention will be explained with Examples and Comparative Examples. In the present invention, a loss factor, η, was measured by a cantilever resonance method using a damping sheet of 2 mm in thickness.

Self-fusibility is shown with values measured by two methods based on an overhang baking test as described below. That is, in the first overhang baking test method, after a test piece 200 mm long, 200 mm wide and 2.0 mm thick is applied by its magnetic force on a steel plate 300 mm long, 300 mm wide and 0.8 mm thick at room temperature, the steel plate with the test piece applied thereon is held horizontally while keeping the piece underneath the plate and the plate is heated at 180° C. for 60 minutes. It is determined whether the test piece drops or not.

The second method is as described below: A set of two steel test plates is prepared in which a steel test plate 50 mm long, 70 mm wide and 0.8 mm thick having a protrusion 25 mm long and 25 mm wide at the center of one side 70 mm wide of the plate in the same plane and another steel test plate 150 mm long, 70 mm wide and 0.8 mm thick having a concave to be engaged with said protrusion are superimposed on a base steel plate 200 mm long, 70 mm wide and 2 mm thick and four corners of the superimposed plates are fixed firmly. Then, a test piece 25 mm wide, 100 mm long and 2 mm thick is put on the steel test plates with the longitudinal side of the test piece being parallel to the longitudinal side of the steel plates, so that the protrusion of the steel test plate is covered with the test piece, and thus the test piece is applied to the steel test plates by magnetic force. Thereafter, the set of steel plates, to which the test piece is applied, is held horizontally while keeping the test piece underneath, baked at 180° C. for 60 minutes, and allowed to cool at room temperature. The base steel plate is then removed. The steel test plates to which the test piece is adhered are pulled by a tension tester at a speed of 200 mm/minute to measure the maximum breaking load of the adhered surface and obtain a shear strength by dividing the measured value by the adhered surface area (6.25 cm$^2$). If the shear strength is not less than 10 kg/cm$^2$, there is no problem on practical use.

Adaptability is measured as follows. Unevenness was formed on the surface of a steel plate of 0.8 mm in thickness and 300 mm in width as a base plate. The shape in the front view of the formed concave is an upwardly flared trapezoid (20 mm in height, 80 mm in upper base length, 140° in slope angle of bottom steel plate at curved ends, 3 mm in radius of curvature at bottom), a damping sheet 2 mm thick, 150 mm wide and 200 mm long is mounted. After the sheet on the substrate is heated in a dryer at 150° C. for 30 minutes, it is taken out in the air and cooled to an ordinary temperature to obtain a test piece. At a curved bottom steel plate of the test piece, a gap between the steel plate and the damping sheet is measured.

A density is shown with a value measured by an electronic density meter EW120SG (manufactured by Mirage Trading Co. Ltd.).

EXAMPLE 1

To a binder comprising 33 parts by weight of an ethylene-vinyl acetate copolymer containing 40% by weight of vinyl acetate and 67 parts by weight of an aromatic petroleum resin (softening point 102° C., Gardner color scale 6, bromine value 21.4) obtained by polymerizing C9 fraction, 160 parts by weight of barium ferrite powder (BET specific surface area 1.9 m$^2$/g, coercive force 2400 Oe, residual magnetization 33.4 emu/g) and 70 parts by weight of mica powder [average particle diameter:340 μm, aspect ratio (average particle diameter/thickness):80] were added and blended. The blend was mixed with heating for 10 minutes in a pressurized kneader, then calender rolled, and magnetized with a magnetizer to prepare a damping sheet having a thickness of 2 mm.

Thus obtained damping sheet was cut into pieces 15 mm wide and 220 mm long, mounted on a substrate made of a steel plate having a thickness of 0.8 mm (15×300 mm), and adhered to the substrate by heating at 150° C. for 30 minutes to obtain a test piece. Loss factors, η, of the test piece at given temperatures were measured by a cantilever resonance method, and the peak value of the loss factor was 0.42 at 40° C. showing that damping effect of the sheet was excellent. The shear strength of the test piece by overhang baking test was 1.9 kg/cm$^2$ and the adaptability was not more than 1 mm, showing excellency of the sheet. The density of the sheet was 2.0.

EXAMPLES 2 TO 10 AND COMPARATIVE EXAMPLES 1 TO 3

Damping sheets were manufactured in the same manner as in Example 1 except that kinds and amounts of ethylene-vinyl acetate copolymer, petroleum resin, hard ferrite powder and auxiliary filler were varied. Main manufacturing conditions and various properties of each of the damping sheets are shown in Tables 1 and 2. In Table 1, average particle diameter of calcium carbonate was measured by the dry method according to JIS Z 8801.

COMPARATIVE EXAMPLE 4

To a binder comprising 87 parts by weight of blown asphalt (penetration 20/30, melting point 90° C.) and 13 parts by weight of butyl rubber (Trade name: JSR.Butyl 268, manufactured by Japan Synthetic Rubber Co.), 125 parts by weight of barium ferrite powder (BET specific surface area 1.9 m$^2$/g, coercive force 2400 Oe, residual magnetization 33.4 emu/g) and 25 parts by weight of mica powder [average particle diameter 340 μm, average plate ratio (average particle diameter/thickness) 80] were added and blended. The blend was mixed with heating for 10 minutes in a pressurized kneader, calender rolled, and magnetized with a magnetizer to obtain a damping sheet having a thickness of 2 mm.

Thus obtained damping sheet was cut into pieces 15 mm wide and 220 mm long, mounted on a substrate made of a steel plate having a thickness of 0.8 mm (15×300 mm), and adhered to the substrate by heating at 150° C. for 30 minutes to obtain a test piece. Loss factors, η, of the test piece at given temperatures were measured by a cantilever resonance method. The peak value of the factor was 0.12 at 10° C., showing that damping effect of the sheet was bad.

TABLE 1

| Examples and Comparative Examples | Material Composition and Amount for Preparing Damping Sheet Binder Material | | | |
|---|---|---|---|---|
| | Kind | Amount (Part by Weight) | Kind | Amount (Part by Weight) |
| | Ehylene-Vinyl Acetate Copolymer | | Petroleum Resin | |
| Example 1 | VA = 40% | 33 | Aromatic Petroleum Resin *1 | 67 |
| Example 2 | VA = 40% | 40 | Same Resin as Example 1 | 60 |
| Example 3 | VA = 60% | 50 | Same Resin as Example 1 | 50 |
| Example 4 | VA = 60% | 33 | Aliphatic-Aromatic Petroleum Resin *2 | 67 |
| Example 5 | VA = 40% | 40 | Same Resin as Example 1 | 60 |
| Example 6 | VA = 35% | 30 | Same Resin as Example 4 | 70 |
| Example 7 | VA = 35% | 40 | Same Resin as Example 1 | 60 |
| Example 8 | VA = 60% | 25 | Same Resin as Example 1 | 75 |
| Example 9 | VA = 40% | 33 | Same Resin as Example 1 | 67 |
| Example 10 | VA = 40% | 33 | Same Resin as Example 1 | 67 |
| Comp. Ex. 1 | VA = 40% | 40 | Same Resin as Example 1 | 60 |
| Comp. Ex. 2 | VA = 40% | 33 | Same Resin as Example 1 | 67 |
| Comp. Ex. 3 | VA = 40% | 100 | — | — |
| | Hard Ferrite Powder | | Auxiliary Filler | |
| Example 1 | Granular Ba Ferrite Particle (Specific Surface Area 1.9 m$^2$/g, Coercive Force 2400 Oe Residual Magnetization 33.4 emu/g) | 160 | Mica Powder (Average Particle Diameter 340 μm Aspect Ratio 80) | 70 |
| Example 2 | Same Ba Ferrite as Example 1 | 60 | Same Mica Powder as Example 1 | 35 |
| | | | Ca Carbonate (Average Particle Size 35 μm) | 35 |
| Example 3 | Same Ba Ferrite as Example 1 | 165 | Same Mica Powder as Example 1 | 65 |
| Example 4 | Same Ba Ferrite as Example 1 | 140 | Same Ca Carbonate as Example 2 | 140 |
| Example 5 | Same Ba Ferrite as Example 1 | 450 | — | — |
| Example 6 | Granular Sr Ferrite Particle (Specific Surface Area 2.6 m$^2$/g) Coercive Force 3300 Oe Residual Magnetization 31.4 emu/g) | 80 | Mica Powder (Average Particle Diameter 90 μm, Aspect Ratio 50) | 100 |
| Example 7 | Same Sr Ferrite as Example 6 | 120 | Same Ca Carbonate as Example 2 | 120 |
| Example 8 | Same Sr Ferrite as Example 6 | 140 | Same Mica Powder as Example 6 | 80 |
| Example 9 | Same Sr Ferrite as Example 6 | 160 | Same Ca Carbonate as Example 2 | 100 |
| Example 10 | Same Ba Ferrite as Example 1 | 210 | — | — |
| Comp. Ex. 1 | Same Ba Ferrite as Example 1 | 40 | Same Mica Powder as Example 1 | 120 |
| Comp. Ex. 2 | Same Ba Ferrite as Example 1 | 100 | Same Ca Carbonate as Example 2 | 600 |
| Comp. Ex. 3 | Same Ba Ferrite as Example 1 | 230 | — | — |

*1 Aromatic Petroleum Resin (Softening Point 102° C., Gardner Color Scale 6, Bromine Value 21.4)
*2 Aliphatic-Aromatic Petroleum Resin (Softening Point 99° C., Gardner Color Scale 7, Bromine Value 29.0)

TABLE 2

| Examples and Comp. Examples | Property of Damping Sheet | | | | | |
|---|---|---|---|---|---|---|
| | Loss Factor η | | Overhang Baking Test | | | |
| | Peak Value (−) | Temperature at Peak (°C.) | Drop Out or Not | Shear Strength (kg/cm$^2$) | Adaptability (mm) | Density |
| Example 1 | 0.42 | 40 | Adhere | 1.9 | 1 or Less | 2.0 |

TABLE 2-continued

| | Property of Damping Sheet | | | | | |
|---|---|---|---|---|---|---|
| | Loss Factor η | | Overhang Baking Test | | | |
| Examples and Comp. Examples | Peak Value (–) | Temperature at Peak (°C.) | Drop Out or Not | Shear Strength (kg/cm$^2$) | Adaptability (mm) | Density |
| Example 2  | 0.35 | 40 | Adhere   | 1.7             | 1 or Less | 1.9 |
| Example 3  | 0.33 | 20 | Adhere   | 1.5             | 1 or Less | 2.1 |
| Example 4  | 0.31 | 30 | Adhere   | 1.7             | 1 or Less | 2.2 |
| Example 5  | 0.32 | 10 | Adhere   | 1.6             | 1~2       | 2.8 |
| Example 6  | 0.34 | 40 | Adhere   | 1.3             | 1~2       | 1.9 |
| Example 7  | 0.31 | 30 | Adhere   | 1.8             | 1~2       | 2.2 |
| Example 8  | 0.34 | 50 | Adhere   | 1.8             | 1~2       | 2.1 |
| Example 9  | 0.35 | 40 | Adhere   | 1.7             | 1~2       | 2.4 |
| Example 10 | 0.31 | 20 | Adhere   | 1.4             | 1 or Less | 1.8 |
| Comp. Ex. 1 | 0.41 | 40 | Drop Out | Can not Measure | 1 or Less | 1.8 |
| Comp. Ex. 2 | 0.29 | 30 | Drop Out | Can not Measure | 2~3       | 2.2 |
| Comp. Ex. 3 | 0.04 | 20 | Adhere   | 0.4             | 1~2       | 2.4 |
| Comp. Ex. 4 | 0.12 | 10 | Adhere   | 1.0             | 1~2       | 1.8 |

EFFECT OF THE INVENTION

Since the self-fusion type damping material of the present invention has excellent self-fusibility and a high damping effect as shown in Examples described before, it can be made lighter, thinner and smaller. Its applicability and workability are excellent because it is possible to suppress and prevent dislocation and sagging thereof at the time of mounting.

What is claimed is:

1. A self-fusion damping material formed from ferrite powder as a filler with a binder, wherein an ethylene-vinyl acetate copolymer and a petroleum resin are used as the binder and said damping material comprises 100 parts by weight of the combined binder mixed with 150 to 600 parts by weight of said filler and wherein the ferrite powder has a coercive force of not less than 1000 Oe and a residual magnetization of not less than 15 emu/g.

2. A self-fusion damping material formed from ferrite powder and an auxiliary filler as a combined filler with a binder, wherein an ethylene-vinyl acetate copolymer and a petroleum resin are used as the binder and said damping material comprises 100 parts by weight of the combined binder mixed with 100 to 600 parts by weight of said combined filler, in which the amounts of said ferrite powder and said auxiliary filler are in the range of 50 to 400 parts by weight and 1 to 200 parts by weight, respectively, based on 100 parts by weight of said combined binder and wherein the ferrite powder has a coercive force of not less than 1000 Oe and a residual magnetization of not less than 15 emu/g.

* * * * *